US006612492B1

(12) United States Patent
Yen (10) Patent No.: US 6,612,492 B1
(45) Date of Patent: Sep. 2, 2003

(54) FOUR-IN-ONE MEMORY CARD INSERTION PORT

(75) Inventor: Ming-Hui Yen, Hsi Chih (TW)

(73) Assignee: Chant Sincere Co., Ltd., Taipei Hsien (TW)

( * ) Notice: Subject to any disclaimer, the term of this patent is extended or adjusted under 35 U.S.C. 154(b) by 0 days.

(21) Appl. No.: 10/162,627

(22) Filed: Jun. 6, 2002

(51) Int. Cl.[7] .................................................. G06K 7/08
(52) U.S. Cl. ...................................... 235/451; 235/492
(58) Field of Search ............................ 235/451, 492; 439/630, 638, 687, 696, 906, 945

(56) References Cited

U.S. PATENT DOCUMENTS 6,134,624 A  * 10/2000 Burns et al. ................ 710/316
6,151,655 A  * 11/2000 Jones et al. ................. 710/244
6,230,885 B1 *  5/2001 Rochelo et al. ........... 206/308.3
6,386,920 B1 *  5/2002 Sun ............................. 439/630
6,402,558 B1 *  6/2002 Hung-Ju et al. ............. 439/638
6,517,376 B1 *  2/2003 Hwang ........................ 439/489

* cited by examiner

Primary Examiner—Thien M. Le
Assistant Examiner—Edwyn Labaze
(74) Attorney, Agent, or Firm—Bacon & Thomas, PLLC (57) ABSTRACT

A four-in-one memory card insertion port has an upper terminal seat and a lower terminal seat. The upper terminal seat has an MS memory card conductive terminal. The lower terminal seat is formed with an SMC conductive terminal, an SD conductive terminal, and an MMC conductive terminals. Thereby, a four-in-one memory card insertion port for MS, SMC, SD, and MMC memory card is formed. Thus interference is avoided and a variety of different memory cards are used in the port.

7 Claims, 8 Drawing Sheets

FOUR-IN-ONE MEMORY CARD INSERTION PORT

BACKGROUND OF THE INVENTION (a) Field of the Invention

The present invention relates to memory cards, and particularly to four-in-one memory card insertion port which is suitable for memory stick (MS), smart media (SMC), secure digital (SD) and multi-media (MMC) memory cards by the arrangement of the upper terminal seat and lower terminal seat so as to avoid the interference in data reading.

(b) Description of the Prior Art

With the advance of computer science, many computer and electronic products are developed for receiving information, for example, notebook computers, PDAs, mobile phones, GPSs, etc. Moreover, many electronic products, such as digital video recorder (DV), digital camera (DC), MP3, digital projector, digital recorder, LCD/PDP, TV, game machine, etc., require to input or output data. Since prior art memory devices, such as hard disk, have larger sizes and smaller capacities, many new memory devices are developed, such as MS, SMC, SD, MMC memory cards, etc. for accessing these device and storing data therein or writing data into these devices.

However, the defects are that these memory cards have different specification and thus several kinds of slots must be designed for suiting the memory cards. In general, these slots are incompatible. Thus, the data in some memory card can not be read by an electronic device with slot of another specification. This induce inconvenience in the data transfer.

In one prior art, an inserting port suitable for two kinds of memory cards are developed, while in these designs, the memory cards are used the same terminal so that the structure of the circuit is complicated and interference induces. Moreover, the communication protocol can not be matched.

SUMMARY OF THE INVENTION

Accordingly, the primary object of the present invention is to provide a four-in-one memory card insertion port having an upper terminal seat and a lower terminal seat. The upper terminal seat has an MS memory card conductive terminal. The lower terminal seat is formed with an SMC conductive terminal, an SD conductive terminal, and an MMC conductive terminals. Thereby, a four-in-one memory card insertion port for MS, SMC, SD, and MMC memory card is formed. Thus interference is avoided and a variety of different memory cards are used in the port.

Another object of the present invention is to provide a four-in-one memory card insertion port including an upper terminal seat and a lower terminal seat. An upper terminal sea is made of insulting material. A front end surface thereof has a plurality of inserting holes. Each inserting hole is installed with a conductive terminal which protrudes to a front and rear ends of the upper terminal seat. A front end of each conductive terminal has a top portion for conducting an MS memory card. The lower terminal seat is a rectangular seat and has two alternatively arranged slots. Each slot is installed with a first conductive terminal which extends to a rear end of the seat and has 22 pins. A front end of each conductive terminal has a first top portion. Thereby, two banks of top portions resist against the SMC memory card having contact points. A front side of the twenty two conductive terminals are installed with nine slots which extend to the front end. A second conductive terminal is installed in the groove, which extends forwards; a front end of the second conductive terminal has a second top portion so as to resist against a SD memory card with nine conductive points, while seven conductive points are used to contact an MMC memory card. The upper terminal seat and lower terminal seat are welded to a circuit board; the second conductive terminals at the front end of the upper terminal seat are installed at rear upper side of the lower terminal seat so as to form a four-in-one memory card insertion port for being inserted by MS, SMC, SD, and MMC memory card.

The various objects and advantages of the present invention will be more readily understood from the following detailed description when read in conjunction with the appended drawing.

DETAILED DESCRIPTION OF THE PREFERRED EMBODIMENTS

Figure 1:
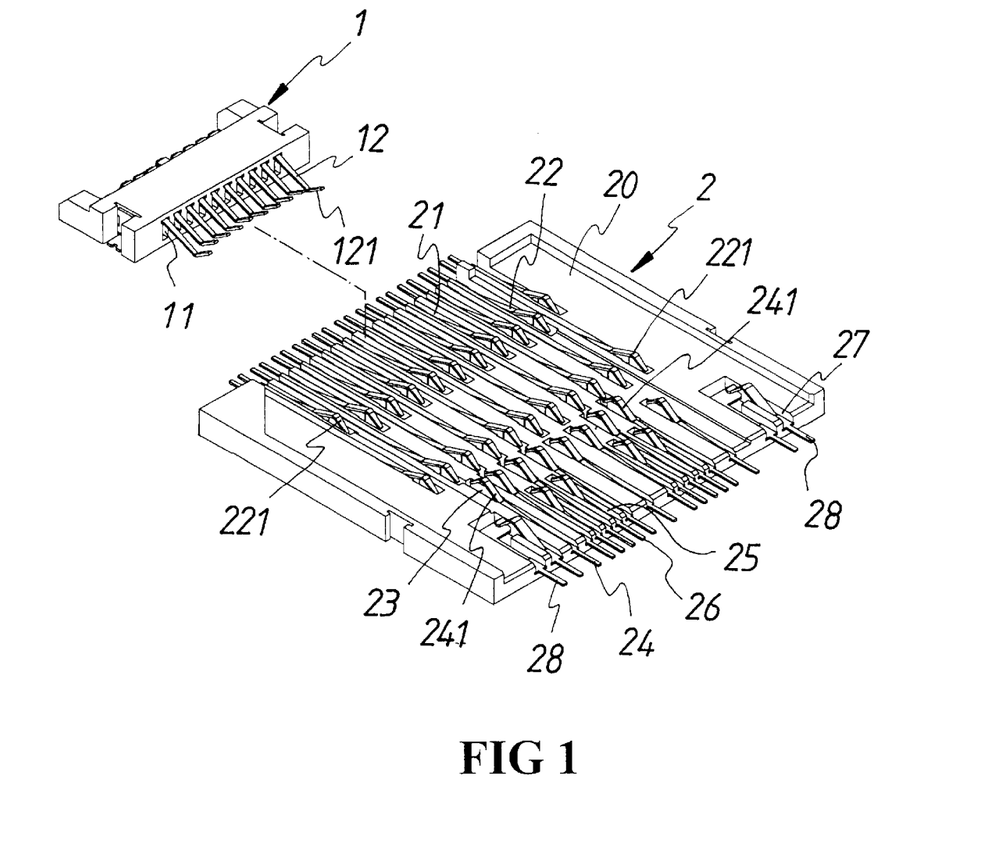
FIG. 1 is an exploded perspective view of the memory card inserting port of the present invention.
Figure 3:
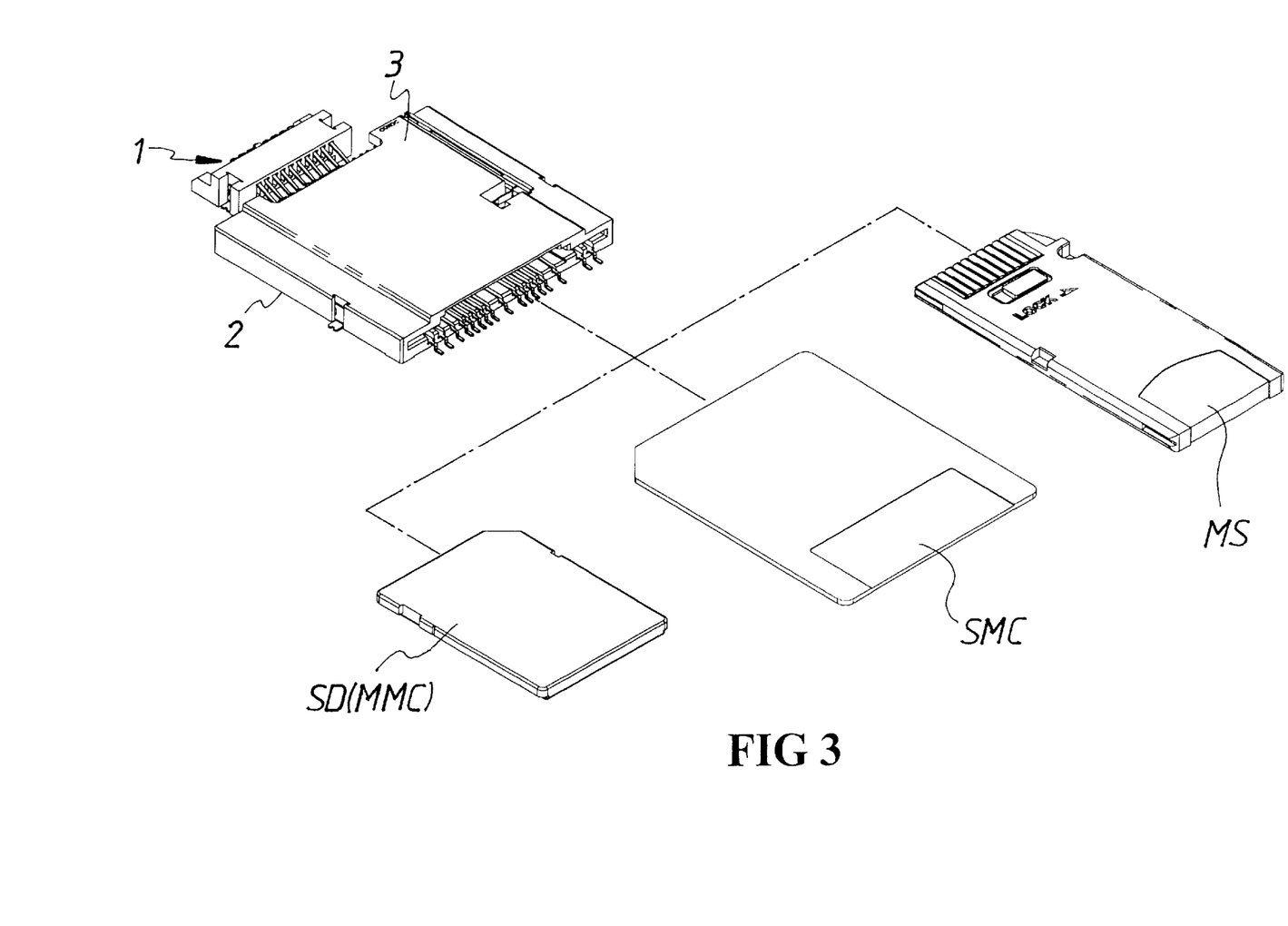
FIG. 3 is a schematic view showing that the present invention can be installed with a plurality of memory cards.

Referring to FIGS. 1 and 3, the four-in-one memory card insertion port of the present invention is illustrated. The four-in-one memory card insertion port mainly includes an upper terminal seat 1 and a lower terminal seat 2. Further an upper cover 3 can be added so as to protect the memory card inserting port.

The upper terminal seat 1, as shown in FIG. 1, is an U shape seat me of insulating material. A front end surface thereof has ten inserting holes 11. Each inserting hole 11 is installed with a conductive terminal 12 which is protruded to the front and rear ends of the upper terminal seat 1 (which has 10 pins). A front end of each conductive terminal 12 has a top portion 121 for conducting an MS memory card with 10 contact points.

The lower terminal seat 2 is a rectangular seat on which a concave stepped portion 20 is installed. The concave stepped portion 20 has two alternatively arranged slots 21 (totally having 22 slots). Each slot 21 is installed with a conductive terminal 22 which extends to the rear end (totally 22 pins). A front end of each conductive terminal 22 has a top portion 221. Thereby, two banks of top portions 221 resist against the SMC memory card having 22 contact points. A front side of the twenty two conductive terminals 22 are installed with nine slots 23 which extend to the front end (referring to the area B of FIG. 4). A conductive terminal 24 is installed in the groove, which extends to the front end (totally nine pins). A front end of the conductive terminal 24 has a top portion 241 so as to resist against a SD memory card with nine conductive points. Thereby, seven conductive points are used to contact an MMC memory card. Next, a front side of the area B of the nine conductive terminal 22 is installed with a bank of four slots 25 which extend to the front end. Each slot has a conductive terminal 26. Thereby, two conductive terminals 26 at one side can be utilized as a write-protecting device of an SMC memory card. Two conductive terminals 26 at another side are utilized as a support device of an MMC memory card. Moreover, two sides of the four conductive terminals 26 are installed two slots 27 which extend to the front end and each has a conductive terminals 28. Thereby, two conductive terminals 28 at one side are used as a write protect device of an SD memory card, but another two conductive terminals 28 at another side are utilized as a switch of the an SMC memory card. As a result, the lower terminal seat 2 can be used by SMC memory cards, SD memory cards, MMC memory cards.

Figure 2:
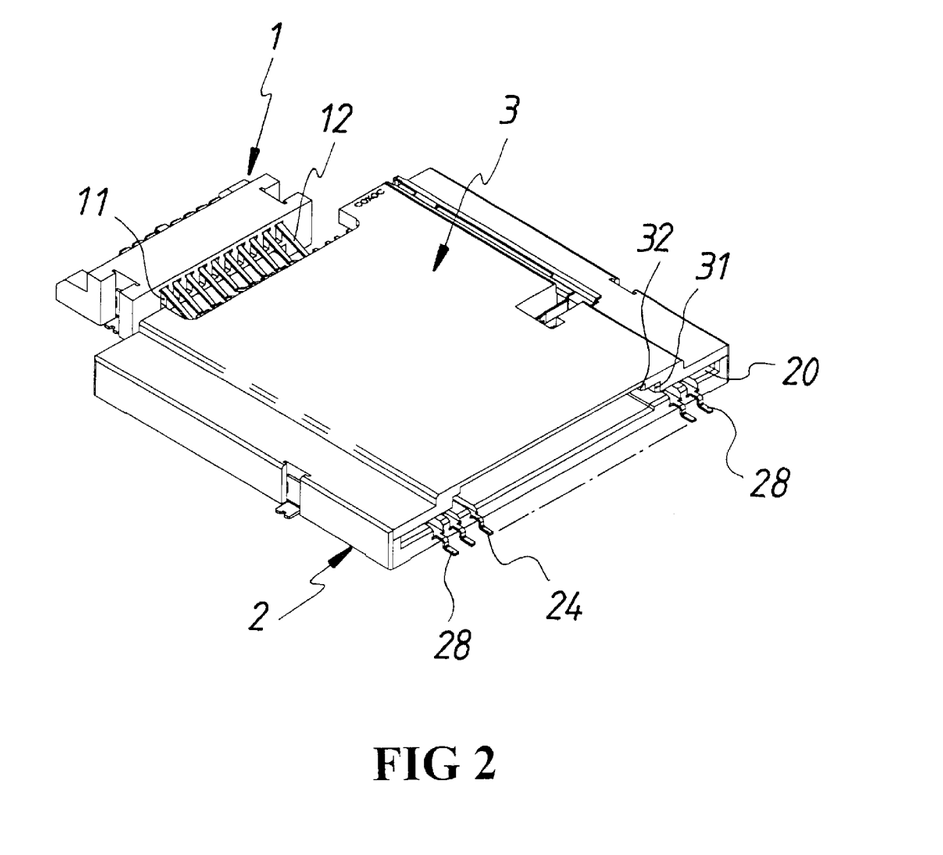
FIG. 2 is an assembled perspective view of the memory card inserting port of the present invention.

Moreover, referring to FIG. 2, the lower terminal seat 2 of the present invention has an upper cover 3. A bottom at a front end of the upper cover 3 is installed two concave stepped portions 31 and 32 which extend to the interior. One side of the upper cover 3 is installed with a groove 33. The groove 33 is installed with two long terminals 34 which are communicated with the bottom so as to conduct with an SD memory card. Thereby, the upper cover 3 is combined to the lower terminal seat 2 so that two concave stepped portions 31 and 32 are used to match with the concave stepped portion 20 of the lower terminal seat 2 as the inserting slots of the MS, SMC, SD and MMC memory cards so that the MS, SMC, SD and MMC memory cards can conduct conveniently.

Figure 4:
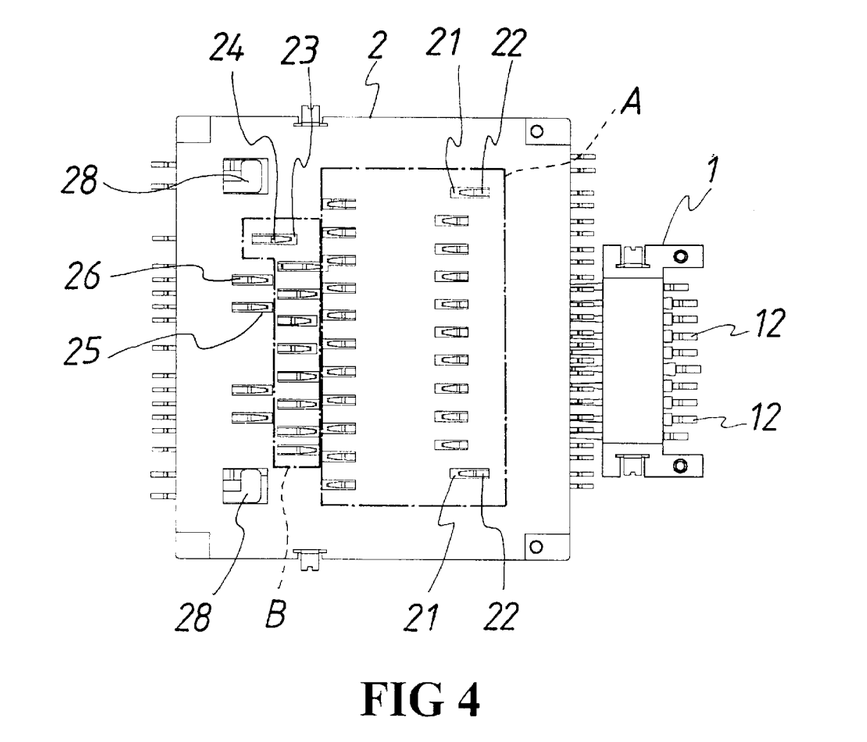
FIG. 4 is an assembled bottom view of the memory card inserting port of the present invention.
Figure 5:
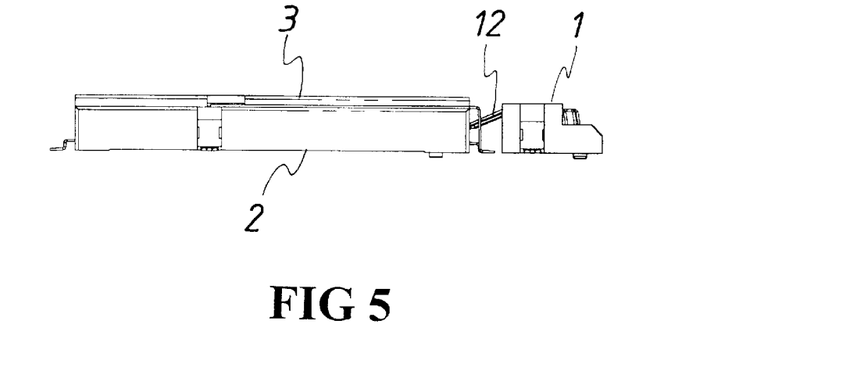
FIG. 5 is an assembled lateral view of the memory card inserting port of the present invention.

Thereby, referring to FIGS. 2 and 5, in the present invention, the upper terminal seat 1 can be matched with the lower terminal seat 2 so as to be assembled to a circuit board of the electronic products. The lower ends of the conductive terminals 12, 22, 24, 26 and 28 are welded to the circuit board. A bank of conductive terminals 12 at a front end of the upper terminal seat 1 is exactly positioned at an upper rear end of the lower terminal seat 2. Thus, the four-in-one memory card insertion port of the present invention is formed, which can be inserted by MS, SMC, SD, and MMC memory card (referring to FIG. 3). As a consequence, one inserting port can be used for a variety of memory cards. When a prior art MS memory card is inserted into the port, it can be conducted to the upper terminal seat 1. When an SMC card is inserted, it can be conductive to a conductive terminal 22 with twenty two pins (referring to area A in FIG. 4). When an SD or MMC memory card is inserted, it can conductive with a conductive terminal 24 of 9 pins since the two have the same structure (referring to area B in FIG. 4). Thereby, MS, SMC, SD, and MMC memory card can be inserted into the port.

Other than being inserted by a variety of memory cards, the present invention has no interference or chaos since the lower terminal seat 2 is provided independently to the conductive terminals 12, 22 and 24 for the MS, SMC, SD, and MMC memory card (referring to FIG. 4). Thus the complexity of a circuit board can be simplified.

Figure 6:
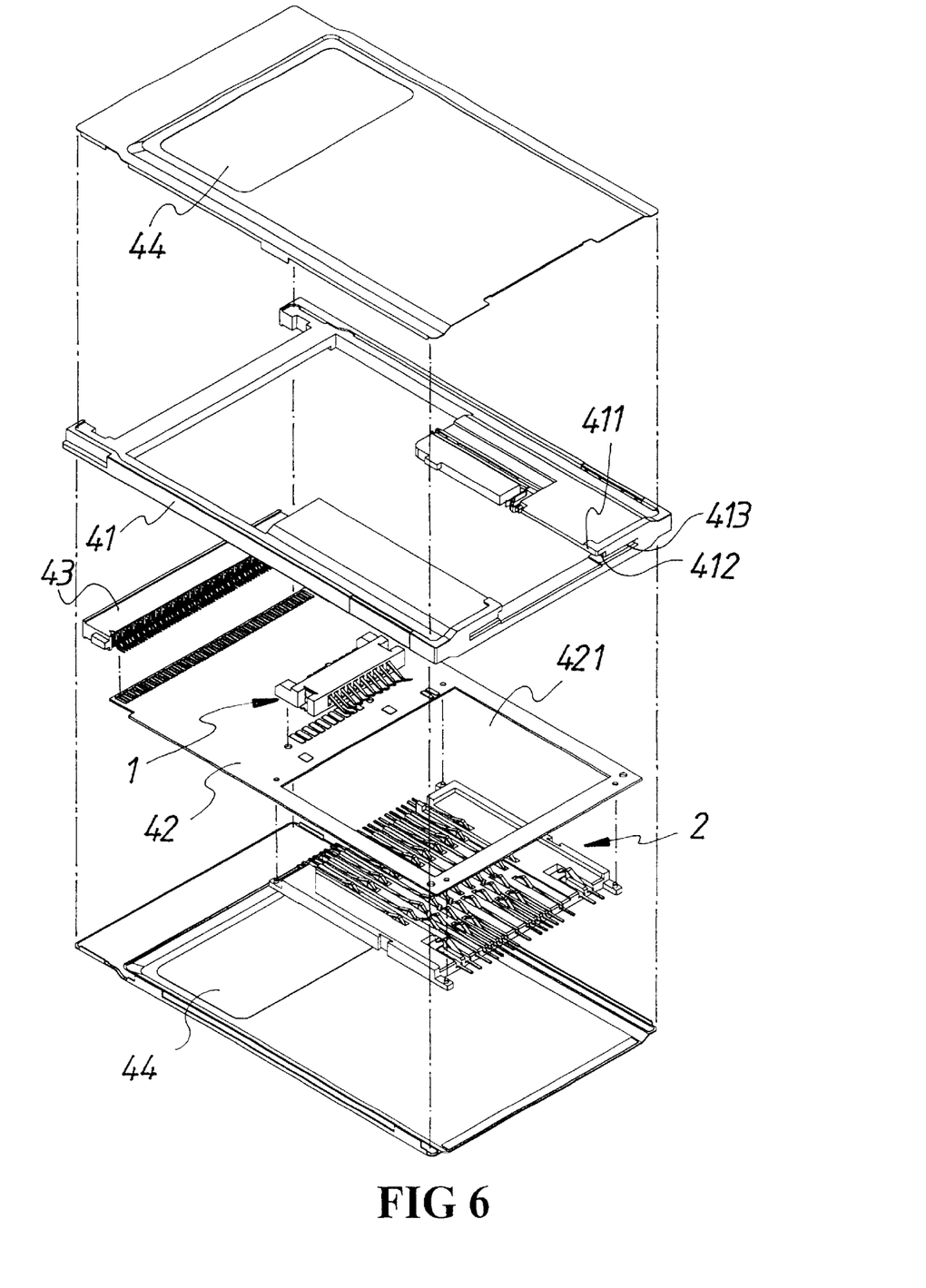
FIG. 6 is an exploded perspective view showing that the present invention is installed to a PCMCIA card.
Figure 7:
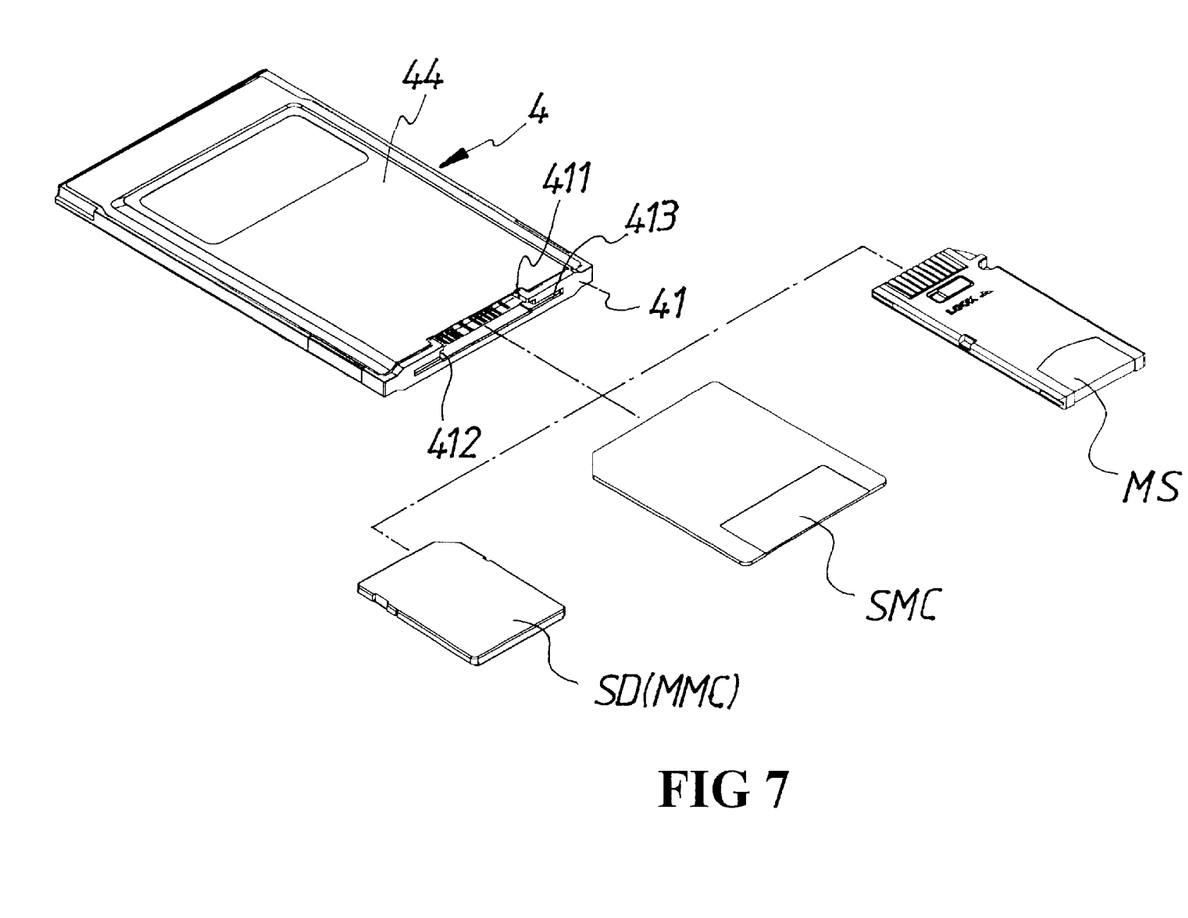
FIG. 7 is an assembled perspective view showing that the present invention is installed to a PCMCIA card.

Next, referring to FIGS. 6 and 7, the present invention is a memory card inserting port formed by an upper terminal seat 1 and a lower terminal seat 2. Other than being installed to an adapter 4 of a Personal Computer Memory Card International Association (PCMCIA) slot, it is installed by a frame 41, a circuit board 42, an adapter 43 and two covers 44.

The frame 41 has a long rectangular shape. A front end thereof is installed with an MS memory card slot 411 which extends to the interior thereof. Two lateral sides of the slot 411 are formed with respective small groove for forming SD and MMC memory card slots 412. Two lateral wall of the slot 412 have respective slits for forming an SMC memory card slot 413. Thereby, a structure used by MS, SMC, SD, and MMC memory cards are formed. A bottom of the frame 41 is firmly secured with a circuit board 42. A middle section of the board has a hollow portion 421 for receiving and welding a lower terminal seat 2. A rear section of the circuit board 42 is welded with an adapter. The frame 41 is sealed by the two covers 44 so as to form a PCMCIA adapter 4 used commonly by MS, SMC, SD, and MMC memory cards. The adapter port 43 at the rear end is used to contact the PCMCIA slot of an electronic product.

Figure 8:
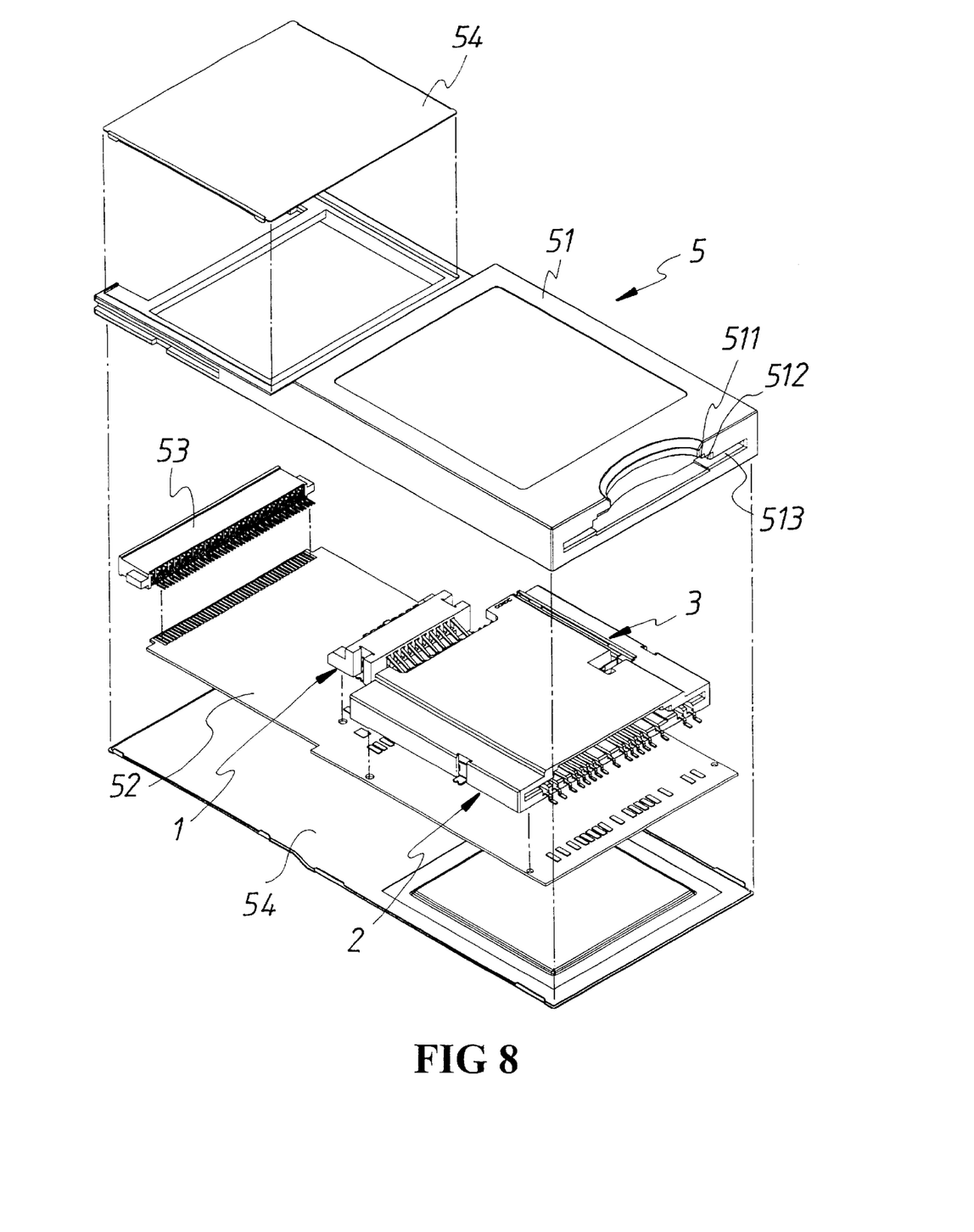
FIG. 8 is an exploded perspective view showing that the present invention is installed to a compact flash (CF) card.
Figure 9:
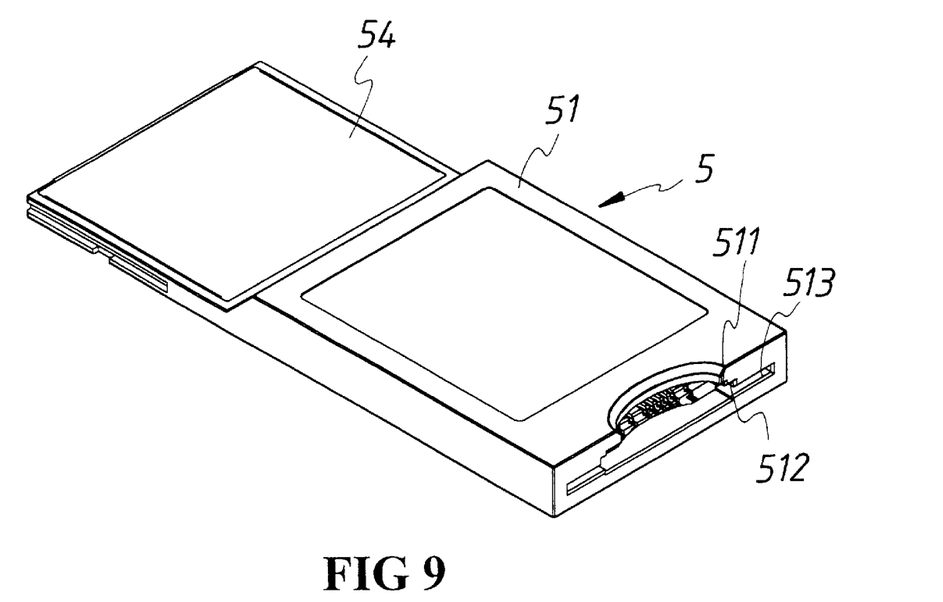
FIG. 9 is an assembled perspective view showing that the present invention is installed to a compact flash (CF) card.

Moreover, referring to FIGS. 8 and 9, the present invention is a memory card inserting port having an upper terminal seat 1 and a lower terminal seat 2, which can be installed to an adapter 5 of CF card slot. In this embodiment, the present invention includes a frame 51, a circuit board 52, an adapter 53 and two covers 54. The frame 51 is a long rectangular frame. A front end thereof is formed with a small groove for forming the SD and MMC memory card slots 512. Two lateral sides of the slot 512 are formed with respective slits for forming the slot 513 of an SMC memory card. Thereby, a structure for being inserted by MS, SMC, SD, and MMC memory card is formed. A bottom of the frame 51 is firmly secured with an adapter 53. A lower side of the frame 51 is sealed by two covers 54. Thereby, an adapter 5 for being inserted by MS, SMC, SD, and MMC memory cards is formed. The adapter 53 at the rear end is used to contact a CF card.

Moreover, by the separated structure of the upper terminal seat 1 and lower terminal seat 2 of the present invention, when only SD, MMC and SMC memory cards are necessary to be used, only the lower terminal seat is necessary to be mounted to a circuit board.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A four-in-one memory card insertion port including an upper terminal seat and a lower terminal seat; wherein the upper terminal seat is made of insulating material; a front end surface thereof has a plurality of inserting holes; each inserting hole is installed with a first conductive terminal which protrudes to a front and a rear ends of the upper terminal seat; a front end of each first conductive terminal has a first top portion for conducting a memory stick (MS) memory card; and the lower terminal seat is a rectangular seat and has two alternatively arranged slots; each slot is installed with a second conductive terminal which extends to a rear end of the seat and has 22 pins; a front end of each conductive terminal has a second top portion; thereby, two banks of second top portions resist against a smart media (SMC) memory card having contact points; front sides of a plurality of twenty two second conductive terminals are installed with nine slots which extend to the front end thereof; a third conductive terminal is installed in a groove, which extends forwards; a front end of the third conductive terminal has a third top portion so as to resist against a secure digital(SD) memory card with nine conductive points, while seven conductive points are used to contact a multi-media (MMC) memory card;

whereby the upper terminal seat and lower terminal seat are welded to a circuit board; the third conductive terminals at the front end of the upper terminal seat are installed at a rear upper side of the lower terminal seat so as to form a four-in-one memory card insertion port for being inserted by the memory stick (MS), smart media (SMC), secure digital (SD) and multi-media (MMC) memory card.

2. The four-in-one memory card insertion port as claimed in claim 1, wherein a front side of the area of the nine conductive terminals is installed with a bank of four slots which extend to the front end; each slot has a third conductive terminal; thereby, two third conductive terminals at one side are utilized as a write protecting device of a smart media (SMC) memory card; two third conductive terminals at another side is utilized as a support device of a multi-media (MMC) memory card.

3. The four-in-one memory card insertion port as claimed in claim 1, wherein two sides of the third conductive terminals are installed with two slots which extend forwards and each has a fourth conductive terminal; thereby, two fourth conductive terminals at one side is used as a write protecting device of a secure digital (SD) memory card, but another two fourth conductive terminals at another side are utilized as a switch of the smart media (SMC) memory card.

4. The four-in-one memory card insertion port as claimed in claim 1, wherein an upper surface of the lower terminal seat has a concave stepped portion as a slot.

5. The four-in-one memory card insertion port as claimed in claim 1, wherein an upper cover is mounted above the lower terminal seat; a bottom at a front end of the upper cover has two concave stepped portions which extend to an interior of the upper cover; one side of the upper cover has a groove; two pins are mounted within the groove which communicate with a bottom for conducting a secure digital (SD) card; thereby, the upper cover is combined to an upper surface of the lower terminal seat, and the two concave stepped portions are used as inserting slots of the memory stick (MS), smart media (SM), secure digital (SD) and multi-media (MMC) memory cards.

6. The four-in-one memory card insertion port as claimed in claim 1, wherein the upper terminal seat and lower terminal seat are installed to an adapter circuit board of a Personal Computer Memory Card International Association (PCMCIA) for being inserted by the memory stick (MS), smart media (SM), secure digital (SD) and multi-media (MMC) memory cards, and adapting port at a rear side of the adapter is utilized to connect with a Personal Computer Memory Card International Association (PCMCIA) card of an electronic product.

7. The four-in-one memory card insertion port as claimed in claim 1, wherein the upper terminal seat and lower terminal seat are installed to an adapter circuit board of a Personal Computer Memory Card International Association (PCMCIA) of a compact flash (CF) memory card for being inserted by the memory stick (MS), smart media (SM), secure digital (SD) and multi-media (MMC) memory cards, and a adapting port at a rear side of the adapter is utilized to be connected to a Personal Computer Memory Card International Association (PCMCIA) card of an electronic product.

* * * * *